United States Patent
Watanabe

[11] Patent Number: 5,862,024
[45] Date of Patent: Jan. 19, 1999

[54] MAGNETIC DISK CARTRIDGE

[75] Inventor: Seiichi Watanabe, Kanagawa-ken, Japan

[73] Assignees: Fuji Photo Film Co., Ltd., Tokyo, Japan; Iomega Corp., Roy, Utah

[21] Appl. No.: 699,407

[22] Filed: Aug. 19, 1996

[51] Int. Cl.$^6$ .............................. G11B 23/03; F16B 4/00
[52] U.S. Cl. ...................... 360/133; 369/291; 403/277; 403/297
[58] Field of Search ...................... 360/132, 133; 369/291; 242/347; 248/73, 222.11, 239; 24/292, 297; 206/308.1, 308.3, 387.1; 403/277, 282, 297, 345, 361, 371, 381, 408.1; 361/785

[56] References Cited

U.S. PATENT DOCUMENTS

| | | | |
|---|---|---|---|
| 4,564,878 | 1/1986 | Weavers et al. | 360/132 |
| 4,706,148 | 11/1987 | Komiyama et al. | 360/132 |
| 5,241,451 | 8/1993 | Walburn et al. | 403/408.1 |
| 5,362,172 | 11/1994 | Hubbling | 360/133 |
| 5,629,823 | 5/1997 | Mizuta | 360/133 |

*Primary Examiner*—George J. Letscher
*Attorney, Agent, or Firm*—Sughrue, Mion, Zinn, Macpeak & Seas, PLLC

[57] ABSTRACT

A magnetic disk cartridge has a first cassette shell half provided with engagement holes and a second cassette shell half provided with engagement pins. Each engagement hole has an entrance portion enabling insertion of an engagement pin and a shoulder-like engagement portion following the entrance portion. Each engagement pin has an elastic structure enabling it to be compressed and is formed at its tip portion with a bulged portion. The bulged portion is formed at its distal end with a tapered portion and at its proximal end with a sloped provisional retaining surface. The first and second cassette shell halves are formed on inner surfaces thereof with abutting surfaces. The cassette shell halves are provisionally assembled in the final assembly step by bringing the sloped provisional retaining surface of the bulged portion of the engagement pin engaged with the engagement hole into engagement with the shoulder-like engagement portion and bringing the abutting surfaces into abutment with each other. The cassette shell obtained by provisionally assembling the cassette shell halves therefore has high dimensional precision and can be easily disassembled before permanent assembly if necessary.

4 Claims, 5 Drawing Sheets

F I G. 1A
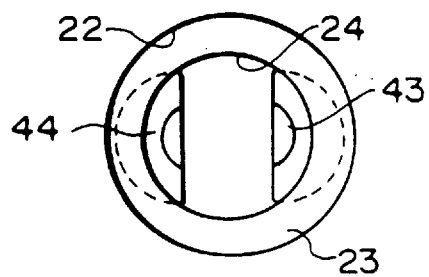
F I G. 1B
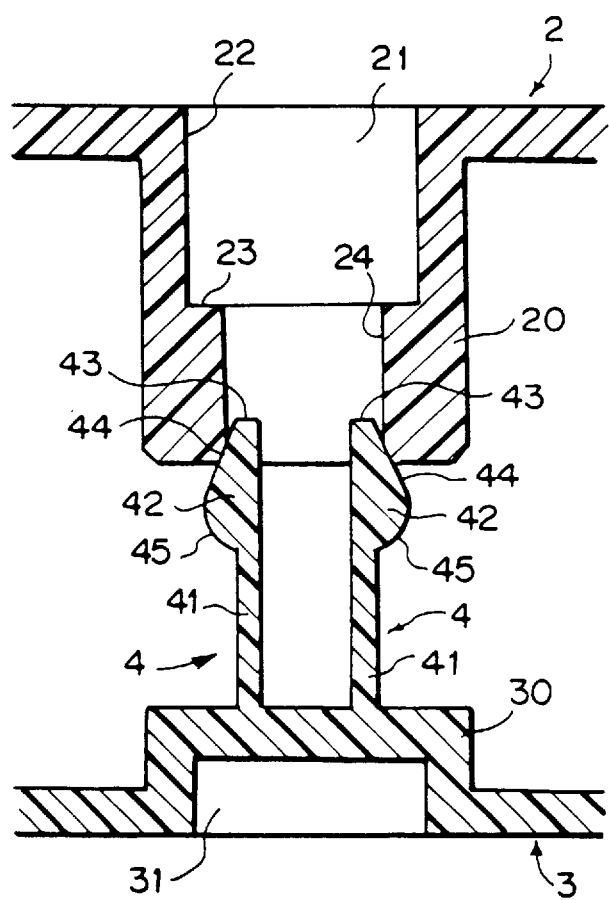

F I G. 2A
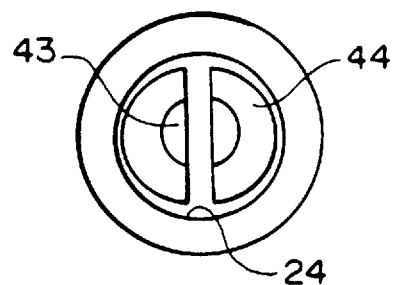
F I G. 2B
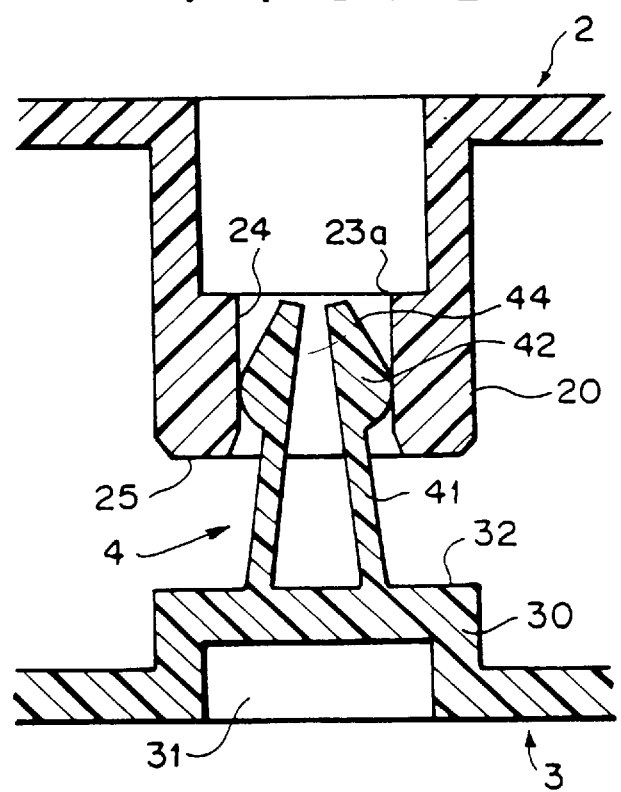

F I G. 3A
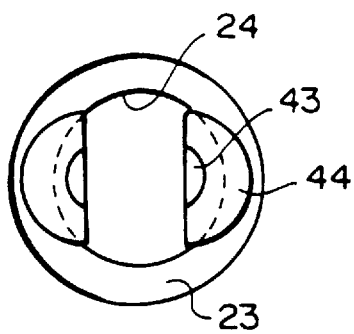
F I G. 3B
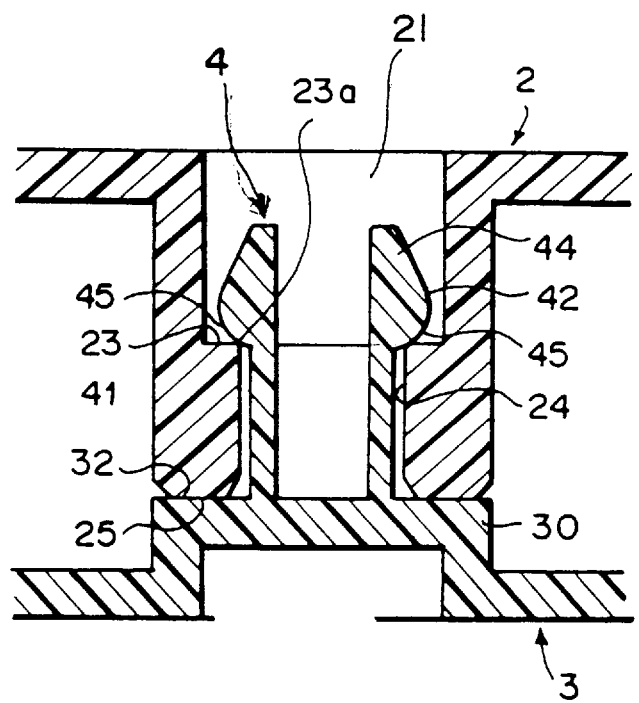

MAGNETIC DISK CARTRIDGE

BACKGROUND OF THE INVENTION

1. Field of the Invention

The present invention relates to a magnetic disk cartridge, and more particularly, to an improved provisional assembly structure for the cassette shell halves of a magnetic disk cartridge having a rotatable magnetic disk encased in a cassette shell constituted by mating and joining a pair of cassette shell halves.

2. Description of the Related Art

A magnetic disk cartridge comprises a magnetic disk for magnetically recording analog and/or digital signals rotatably encased in a thin cassette shell. The cassette shell is formed in the shape of a flat prism with a rectangular top surface slightly larger than the magnetic disk, a bottom surface having an opening through which a center core supporting the center of the magnetic disk is exposed and narrow side surfaces extending between the outer peripheral edges of the top and bottom surfaces. The magnetic disk cartridge is provided with a magnetic head access opening for insertion/withdrawal of magnetic heads used for magnetic recording and reproducing so as to enable the magnetic heads to be brought into contact with, or close to, the opposite surfaces of the magnetic disk from the exterior. The magnetic head access opening is equipped with a shutter for preventing invasion of dust and the like when the magnetic disk cartridge is not in use. Liners made of nonwoven fabric or the like are attached to the inner surfaces of the cassette shell opposite the main surfaces of the magnetic disk for protecting the surfaces of the magnetic disk from scratching as well as for wiping off dust and the like adhering thereto.

The space inside the cassette shell of the conventional magnetic disk cartridge is fairly large in the direction of magnetic disk thickness and the liners are accommodated in the spaces remaining above and below magnetic disk. Each liner is urged away from the inner surface of the cassette shell and maintained in contact with the corresponding surface of the magnetic disk by a weak plate spring called a lifter. Owing to this arrangement, a certain degree of tolerance is available regarding the dimensional precision of the cassette shell in the thickness direction.

In recent years, new high-density recording methods have led to the development of a magnetic disk cartridge with 50 times the capacity of the widely used conventional magnetic disk cartridge (3.5-inch floppy disk). The magnetic disk of this type of magnetic disk cartridge is rotated at a much faster speed than the conventional one and the magnetic heads used for recording and reproducing signals to/from the magnetic disk are required to be positioned with very high precision.

A quality inspection is conducted as the final step in the assembly of magnetic disk cartridges and a cartridge found to be defective is removed from the line as a reject. Various types of defects may occur. When the defect is in the magnetic disk, not the cassette shell halves, it is preferable for the cassette shell halves to be reusable since they are precision molded and therefore expensive to produce.

The magnetic disk cartridge comprises a pair of mated and joined cassette shell halves and the magnetic disk is encased by the cassette shell halves to be rotatable therein. Thus, if the quality inspection is conducted before the cassette shell halves encasing the magnetic disk are permanently joined by ultrasonic welding or the like in the final assembly step, a magnetic disk found to be defective can be replaced and the cassette shell halves be reused.

It is therefore preferable to adopt a structure which, in the final assembly step, allows the cassette shell halves to be provisionally assembled after the magnetic disk has been accommodated therein and the quality inspection to be conducted before permanent assembly by welding or the like so that the cassette shell halves can be readily disassembled if the magnetic disk is defective.

Although a provisional assembly structure employing screw fastening has been adopted in conventional audio and video cassettes, screw fastening limits the number of reuses possible because the tapped hole receiving the screw wears with repeated screw fastening. In addition, the screw fastening and screw removal operations are inefficient because each screw has to be turned independently with a screwdriver.

A method of provisionally assembling the cassette shell halves by inserting engaging pins provided on one cassette shell half into engaging holes provided in the other was therefore proposed. Since this method requires a certain amount of play to be established between the engagement pins and the engagement holes, however, some of the resulting provisionally assembled cassette shells turn out to have a loose fit between the cassette shell halves. A thorough quality inspection of a provisionally assembled magnetic disk cartridge with loosely fitted cassette shell halves has been found to be impossible owing to the difficulty of rotating its disk at a high speed.

SUMMARY OF THE INVENTION

This invention was accomplished in light of the foregoing and has as its object to provide a magnetic disk cartridge having a provisional assembly structure which, in the final assembly step, enables the upper and lower cassette shell halves to be provisionally assembled with ease after the magnetic disk has been accommodated therein and enables the cassette shell halves to be readily disassembled when the magnetic disk is found to be defective.

For achieving this object, the invention provides a magnetic disk cartridge comprising a first cassette shell half provided with at least one engagement hole and a second cassette shell half provided with at least one engagement pin for insertion into and engagement with the engagement hole, wherein the engagement hole has an entrance portion enabling insertion of the engagement pin and a shoulder-like engagement portion following the entrance portion, the engagement pin has an elastic structure enabling it to be elastically compressed by an external force to an outer diameter smaller than an inner diameter of the entrance portion and to elastically expand to a diameter larger than the inner diameter of the entrance portion when the force is released and is formed at a tip portion thereof with a large-diameter bulged portion having a tapered portion at its distal end and a sloped provisional retaining surface at its proximal end, and the first and second cassette shell halves are formed on inner surfaces thereof with abutting surfaces which come into abutment when the cassette shell is provisionally assembled, the cassette shell being provisionally assembled by bringing the sloped provisional retaining surface of the bulged portion of the engagement pin engaged with the engagement hole into engagement with the shoulder-like engagement portion and the abutting surfaces into abutment with each other.

The sloped provisional retaining surface of the bulged portion of the engagement pin can be straight as viewed in a section parallel to the direction of engagement (can be conical) but preferably has a convex arcuate shape when viewed in the same section.

The engagement pin is formed integrally with, and is made of the same hard resin as, the associated cassette shell half. It can be formed as a split engagement pin comprising 2, 3, 4 or more segments such that the outer configurations of the segments collectively constitute the configuration of the engagement pin.

The abutting surfaces of the cassette shell halves can be formed apart from the engagement hole and the engagement pin or be formed adjacent thereto.

BRIEF DESCRIPTION OF THE DRAWINGS

FIG. 1(A) is a top view of an essential portion of a magnetic disk cartridge which is an embodiment of the invention, showing an engagement hole prior to insertion of an engagement pin, and FIG. 1(B) is partial sectional view showing the engagement pin positioned for insertion into the engagement hole.

FIG. 2(A) is a top view of an essential portion of the magnetic disk cartridge of FIG. 1, showing an engagement hole with an engagement pin inserted therein, and FIG. 2(B) is partial sectional view showing a partially engaged state of the engagement pin and the engagement hole.

FIG. 3(A) is a top view of an essential portion of the magnetic disk cartridge of FIG. 1, showing an engagement hole with an engagement pin provisionally engaged therewith (the provisionally assembled state), and FIG. 3(B) is a partial sectional view showing the engaged state of the engagement pin and the engagement hole.

DESCRIPTION OF THE PREFERRED EMBODIMENTS

The magnetic disk cartridge of the present invention will hereinbelow be described with reference to the accompanying drawings.

Figure 4:
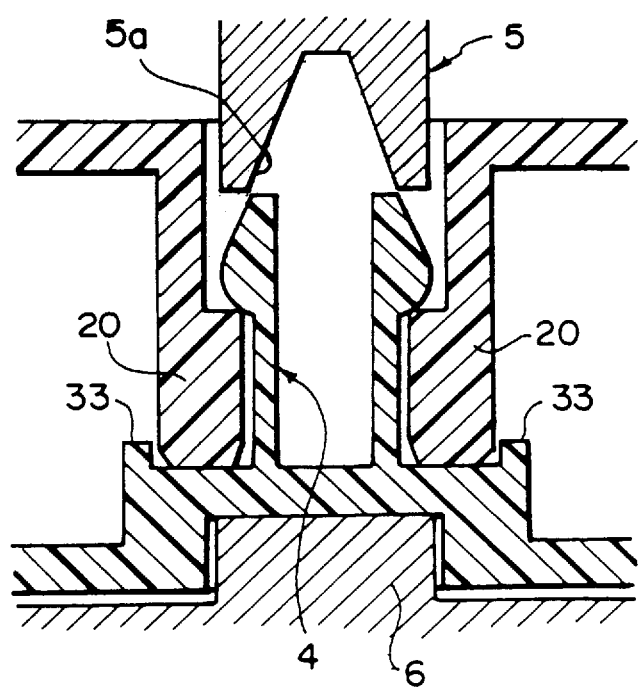
FIG. 4 is a sectional view of an essential portion of a magnetic disk cartridge which is another embodiment of the invention, showing the provisionally assembled state.
Figure 5:
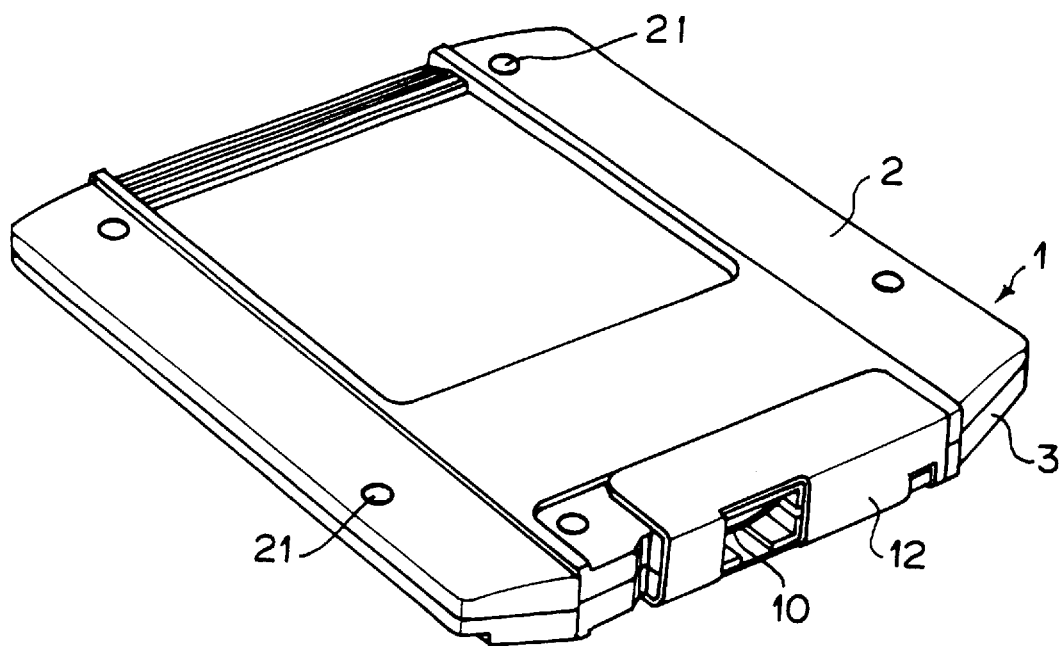
FIG. 5 is a top perspective view showing the overall configuration of the magnetic disk cartridge according to the invention.
Figure 6:
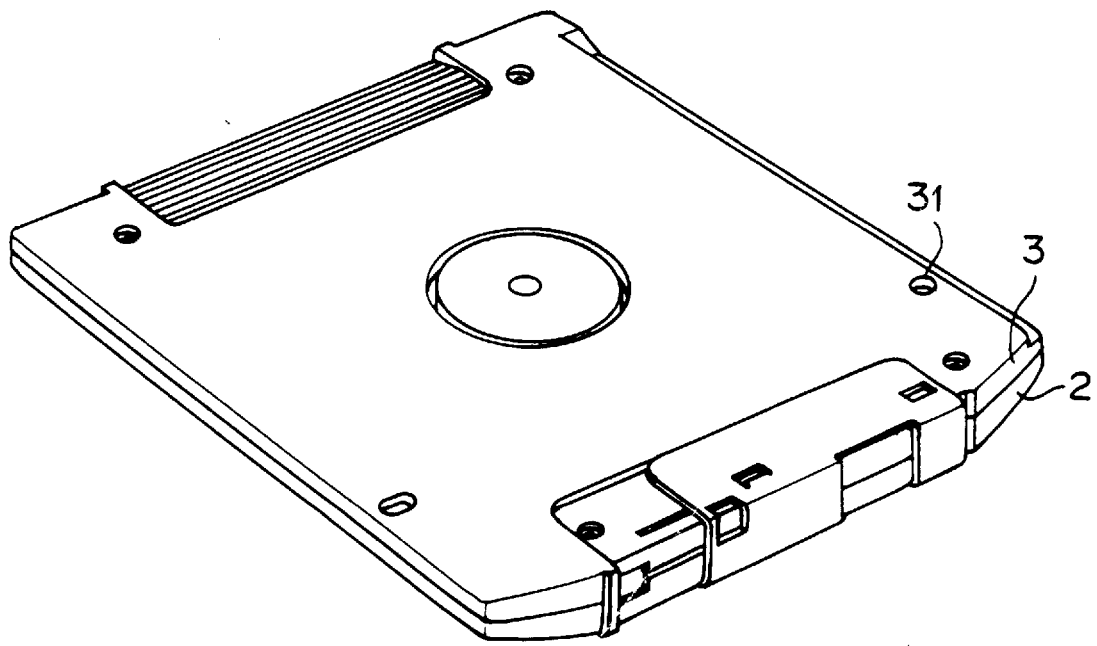
FIG. 6 is a bottom perspective view showing the overall configuration of the magnetic disk cartridge according to the invention.

FIGS. 1 to 3 are partial views showing an essential portion of a magnetic disk cartridge that is an embodiment of the invention. FIGS. 1(A), 2(A) and 3(A) are top views of an engagement hole, while FIGS. 1(B), 2(B) and 3(B) are sectional views showing progressive stages in the engagement of an engagement pin with the engagement hole. Specifically, FIGS. 1(A) and 1(B) show the engagement pin positioned for insertion into the engagement hole, FIGS. 2(A) and 2(B) show a partially engaged state of the engagement pin and the engagement hole, and FIGS. 3(A) and 3(B) show the fully engaged state (provisionally assembled state) of the engagement pin and the engagement hole. FIG. 4 is a partial view of a magnetic disk cartridge which is another embodiment of the invention, showing the provisionally assembled state. Although the magnetic disk cartridge according to this invention includes multiple pairs of engagement pins and engagement holes, the following description of specific embodiments is limited to a single pair on the understanding that the description also applies to the other pairs. FIGS. 5 and 6 show the overall configuration of an invention magnetic disk cartridge.

As shown in FIG. 5, the magnetic disk cartridge comprises a pair of upper and lower cassette shell halves 2, 3 mated and joined to form a cassette shell 1 encasing a magnetic disk 10 to be rotatable therein. One side surface of the cassette shell 1 is formed with a magnetic head access opening and this side of the cassette shell 1 is fitted with a slidable shutter 12 for opening and closing the magnetic head access opening. The shutter 12, which is biased in the closing direction, is shown in the open position in FIG. 5 and the closed position in FIG. 6.

FIGS. 1(A) to 3(B) enlarged views of an engagement portion between the cassette shell halves.

The upper and lower cassette shell halves 2, 3 are made of hard resin. The upper cassette shell half 2 is provided with engagement holes 21 (at the locations shown in FIG. 5) and the lower cassette shell half 3 is integrally provided at corresponding locations with engagement pins 4 of the same hard resin material for engagement with the engagement holes 21. Each engagement pin 4 is formed of a pair of engagement pin segments 41, 41. Each engagement hole 21 is formed with an entrance portion 24 for insertion of the engagement pin segments 41, 41, a large-diameter portion 22 following the entrance portion 24 and opening at the upper surface of the upper cassette shell half 2, and a shoulder-like engagement portion 23 at the boundary between the entrance portion 24 and the large-diameter portion 22. As shown in FIG. 1, the engagement pin 4 (the engagement pin segments 41, 41) normally has an overall outer diameter larger than the inner diameter of the entrance portion 24. During insertion into the engagement hole 21, the engagement pin 4 (the engagement pin segments 41, 41) is first elastically compressed to an overall outer diameter equal to or smaller than the inner diameter of the entrance portion 24 (FIG. 2(B) and then elastically expands (restores) to an overall outer diameter larger than the inner diameter of the entrance portion 24 (FIG. 3(B)). The tip of the engagement pin 4 (the engagement pin segments 41, 41) is formed with large-diameter bulged portions 42, 42. The bulged portions 42, 42 are formed with tapered portions 44, 44 at their distal ends and with sloped provisional retaining surfaces 45, 45 at their proximal ends. When the cassette shell halves 2, 3 are provisionally assembled, the sloped provisional retaining surfaces 45, 45 of the bulged portions 42, 42 of the engagement pin 4 inserted through the entrance portion 24 come into engagement with the shoulder-like engagement portion 23, at which point abutting surfaces 25, 32 provided on the inner surfaces of the cassette shell halves 2, 3 at the engagement hole 21 and the engagement pin 4 abut on each other, thereby ensuring the dimensional precision of the provisionally assembled cassette shell (see FIG. 3(B)). The abutting surface 25 is formed at the bottom end of the wall 20 of the engagement hole 21 and the abutting surface 32 is formed at the top surface of a base 30 of the engagement pin 4. In this embodiment, the distal extremities of the engagement pin segments 41, 41 are formed as flat surfaces 43, 43.

FIGS. 1(A) and 1(B) show the initial stage of the provisional assembly. In this stage, a top portion of the tip of the engagement pin 4 (engagement pin segments 41, 41) including the flat surfaces 43, 43 is positioned at the mouth of the entrance portion 24 (i.e., at the end of the entrance portion 24 opposite from that communicating with the engagement hole 21). The outer surface of the base 30 of the engagement pin 4 is indented into a recess 31. After a positioning jig (indicated by reference numeral 6 in FIG. 4) has been inserted into the recess 31, the cassette shell halves 2, 3 are pressed toward each other. As shown in FIG. 2(B), the resulting pressure on the tapered portions 44, 44 at the tips of the bulged portions 42, 42 of the engagement pin segments 41, 41 elastically compresses the engagement pin segments 41, 41 to an outer diameter as small as that of the inner diameter of the entrance portion 24. The engagement pin segments 41, 41 advance through the entrance portion 24 until the trailing ends of the bulged portions 42, 42 reach the large-diameter portion 22, whereupon the engagement pin segments 41, 41 elastically expand to an outer diameter larger than that of the entrance portion 24, as shown in FIG. 3(B). As a result, the sloped provisional retaining surfaces 45, 45 of the bulged portions 42, 42 engage with the shoulder-like engagement portion 23. At this time, the abutting surfaces 25, 32 on the inner surfaces of the cassette shell halves 2, 3 are in abutment with each other and are held in this state since the sloped provisional retaining surfaces 45, 45 operate to force the cassette shell halves 2, 3 onto each other. This ensures the prescribed thickness of the cassette shell 1 to a high degree of accuracy. Since the sloped provisional retaining surfaces 45, 45 have convex arcuate shapes as viewed in a section parallel to the engagement direction, their engagement with the edge 23a of the shoulder-like engagement portion 23 produces a strong engaging force between the cassette shell halves 2, 3. The cassette shell halves 2, 3 are thus firmly engaged and safe from separation under ordinary forces acting thereon.

If the magnetic disk encased by the provisionally assembled cassette shell 1 is found to be defective in the quality inspection, the provisionally assembled cassette shell 1 can be disassembled to allow its replacement. The disassembly of the cassette shell 1 is achieved by holding the upper cassette shell half 2 with one or more suction cups or the like, pressing down on the engagement pin segments 41, 41 with a tool like that designated by reference numeral 5 in FIG. 4 so that sloped portions 5a of the bottom surface of the tool 5 elastically bend the heads of the engagement pin segments 41, 41 inward and reduce the outer diameter of the bulged portions 42, 42 of the engagement pin segments 41, 41 to no larger than the inner diameter of the entrance portion 24, and then further pressing down on the engagement pin segments 41, 41 until they fall out of the entrance portion 24 and the lower cassette shell half 3 falls away from the upper cassette shell half 2.

If no defect is discovered in the quality inspection, the cassette shell 1 is permanently assembled. This is achieved from the provisionally assembled state shown in FIGS. 3(A) and 3(B) by using another tool to press down on the large-diameter bulged portions 42, 42 of the engagement pin segments 41, 41 and crush them inside the large-diameter portion 22 of the engagement hole 21, thereby producing a strong engagement force with the shoulder-like engagement portion 23 and inseparably fixing the cassette shell halves 2, 3 together.

FIG. 4 shows another embodiment of the invention which more reliably ensures that the crushing of the bulged portions 42, 42 of the engagement pin segments 41, 41 with a tool produces strong engagement with the shoulder-like engagement portion 23. In this embodiment, an annular protuberance 33 is formed on the base 30 of the engagement pin 4 to enclose the wall 20 of the engagement hole 21 and thereby retain it in the proper position.

Other methods can also be used for fixing the bulged portions 42, 42 of the engagement pin segments 41, 41 to the shoulder-like engagement portion 23 within the large-diameter portion 22. For example, it is possible to fuse them with heat or to secure the sloped provisional retaining surfaces 45, 45 of the bulged portions 42, 42 of the engagement pin segments 41, 41 to the shoulder-like engagement portion 23 by ultrasonic welding.

The magnetic disk cartridge according this invention has a first cassette shell half provided with engagement holes and a second cassette shell half provided with engagement pins. Each engagement hole has an entrance portion enabling insertion of an engagement pin and a shoulder-like engagement portion following the entrance portion. Each engagement pin is formed at a tip portion thereof with a large-diameter bulged portion having a tapered portion at its distal end and a sloped provisional retaining surface at its proximal end and has an elastic structure enabling it to be elastically compressed by an external force to an outer diameter smaller than the inner diameter of the entrance portion and to elastically expand to a diameter larger than the inner diameter of the entrance portion when the force is released. The first and second cassette shell halves are formed on inner surfaces thereof with abutting surfaces which come into abutment when the cassette shell is provisionally assembled. The cassette shell of the magnetic disk cartridge can thus be provisionally assembled simply by pressing the cassette shell halves onto each other. This is because the resulting pressure on the tapered portions at the tip of the engagement pin elastically compresses the engagement pin to an outer diameter as small as that of the inner diameter of the entrance portion so that the engagement pin advances through the entrance portion until the trailing end of the bulged portion reaches the shoulder-like engagement portion, whereupon the bulged portion of the engagement pin elastically expands to an outer diameter larger than that of the entrance portion. As a result, the sloped provisional retaining surface of the bulged portion engages with the shoulder-like engagement portion. The abutting surfaces on the inner surfaces of the cassette shell halves are in abutment with each other at this time and the sloped provisional retaining surface operates to force the cassette shell halves onto each other. This ensures the prescribed thickness of the cassette shell to a high degree of accuracy.

The provisionally assembled cassette shell halves can be permanently assembled simply by crushing or welding the bulged portions exposed at the opposite end of the engagement holes.

What is claimed is:

1. A magnetic disk cartridge comprising:
   a magnetic disk,
   a cassette shell encasing the magnetic disk to be rotatable therein and being formed by mating and joining a first cassette shell half integrally provided with at least one engagement hole and a second cassette shell half provided with at least one engagement pin for insertion into and engagement with the engagement hole, wherein
   the engagement hole has an entrance portion enabling insertion of the engagement pin and a shoulder-like engagement portion following the entrance portion,
   the engagement pin is formed at a tip portion thereof with a large-diameter bulged portion having a tapered portion at its distal end and a sloped provisional retaining surface at its proximal end and has an elastic structure enabling the bulged portion to be elastically compressed by an external force to an outer diameter smaller than an inner diameter of the entrance portion and to elastically expand to a diameter larger than the inner diameter of the entrance portion when the force is released, thereby to come into engagement with said shoulder-like engagement portion, and
   the first and second cassette shell halves are formed on inner surfaces thereof with abutting surfaces which are in abutment during provisional assembly,
   the cassette shell being provisionally assembled by bringing the sloped provisional retaining surface of the bulged portion of the engagement pin engaged with the engagement hole entrance portion into engagement with the shoulder-like engagement portion and the abutting surfaces into abutment with each other.

2. A magnetic disk cartridge as defined in claim 1, wherein the sloped provisional retaining surface of the bulged portion of the engagement pin has a convex arcuate shape in a section parallel to the engagement direction.

3. A magnetic disk cartridge as defined in claim 1 or 2, wherein the engagement pin is formed of multiple engagement pin segments and the outer configurations of the segments collectively constitute the configuration of the engagement pin.

4. A magnetic disk cartridge as defined in claim 1 or 2, wherein the abutting surfaces of the cassette shell halves are formed adjacent to the engagement hole and the engagement pin.

* * * * *